United States Patent [19]

Adair et al.

[11] Patent Number: 5,402,548
[45] Date of Patent: Apr. 4, 1995

[54] DUCT CLEANING APPARATUS

[76] Inventors: Michael A. Adair, 11511 Lakeside Ct., Champlin, Minn. 55316; John F. Holmes, Sr., 15300 N. 37th Ave., Plymouth, Minn. 55446

[21] Appl. No.: 40,927

[22] Filed: Mar. 31, 1993

[51] Int. Cl.⁶ .............................................. A46B 7/10
[52] U.S. Cl. ................................... 15/88; 15/24; 15/22.1; 15/50.3
[58] Field of Search ............... 15/24, 22.1, 28, 29, 15/104.12, 179, 52, 23, 503, 104.14, 104.07, 88

[56] References Cited

U.S. PATENT DOCUMENTS

| | | | |
|---|---|---|---|
| 574,422 | 1/1897 | Hildreth . | |
| 754,955 | 3/1904 | Lemke . | |
| 1,563,707 | 12/1925 | Hohl . | |
| 1,584,740 | 5/1926 | Denny . | |
| 1,701,795 | 2/1929 | Pitts | 15/24 |
| 2,155,205 | 4/1939 | Rodgers | 15/104.12 |
| 2,162,677 | 6/1939 | Reynolds | 15/104.14 |
| 2,735,794 | 2/1956 | Pletcher | 15/104.12 |
| 2,911,665 | 11/1959 | Mackiewicz et al. | 15/24 |
| 3,643,282 | 2/1972 | Lechene et al. | 15/179 |
| 3,649,984 | 3/1972 | Kershaw et al. | 15/179 |
| 4,027,349 | 6/1977 | Clavin | 15/104.12 |
| 4,092,744 | 6/1978 | Butoi | 15/24 |
| 4,461,052 | 7/1984 | Mostul | 15/24 |
| 4,666,530 | 5/1987 | Houser | 15/320 X |
| 4,968,333 | 11/1990 | Ellis et al. | 55/341.1 |
| 5,069,691 | 12/1991 | Travis et al. | 55/126 |
| 5,146,642 | 9/1992 | Mank et al. | 15/24 |

*Primary Examiner*—David A. Scherbel
*Assistant Examiner*—Patrick F. Brinson
*Attorney, Agent, or Firm*—Dorsey & Whitney

[57] ABSTRACT

A cleaning apparatus for cleaning the inside surfaces of HVAC ducts or the like is provided by the present invention. The apparatus broadly includes a rotatable cleaning head, a fluid driven drive means, and a variable length lightweight handle. The cleaning head carries a plurality of brush members, each including a tubular stiffener and a group of bristles received in said stiffener. The drive means is a pneumatic motor adapted to rotate the cleaning head which is mounted on the output head of the motor. The input end of the motor is connected to the handle, and the end of the handle is connected to a source of pressurized fluid.

14 Claims, 4 Drawing Sheets

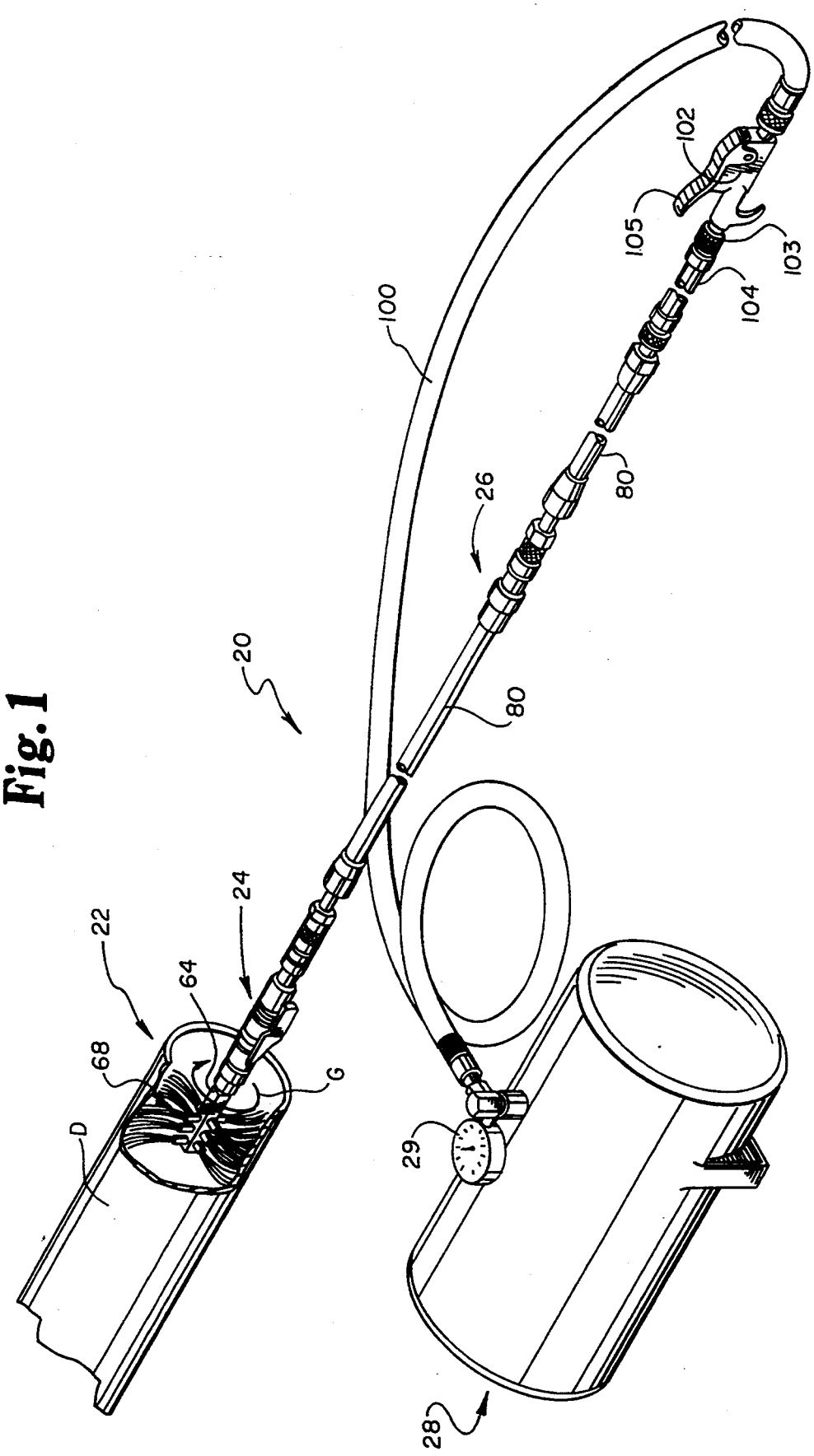

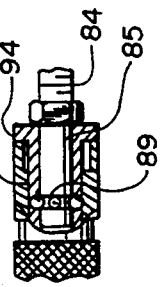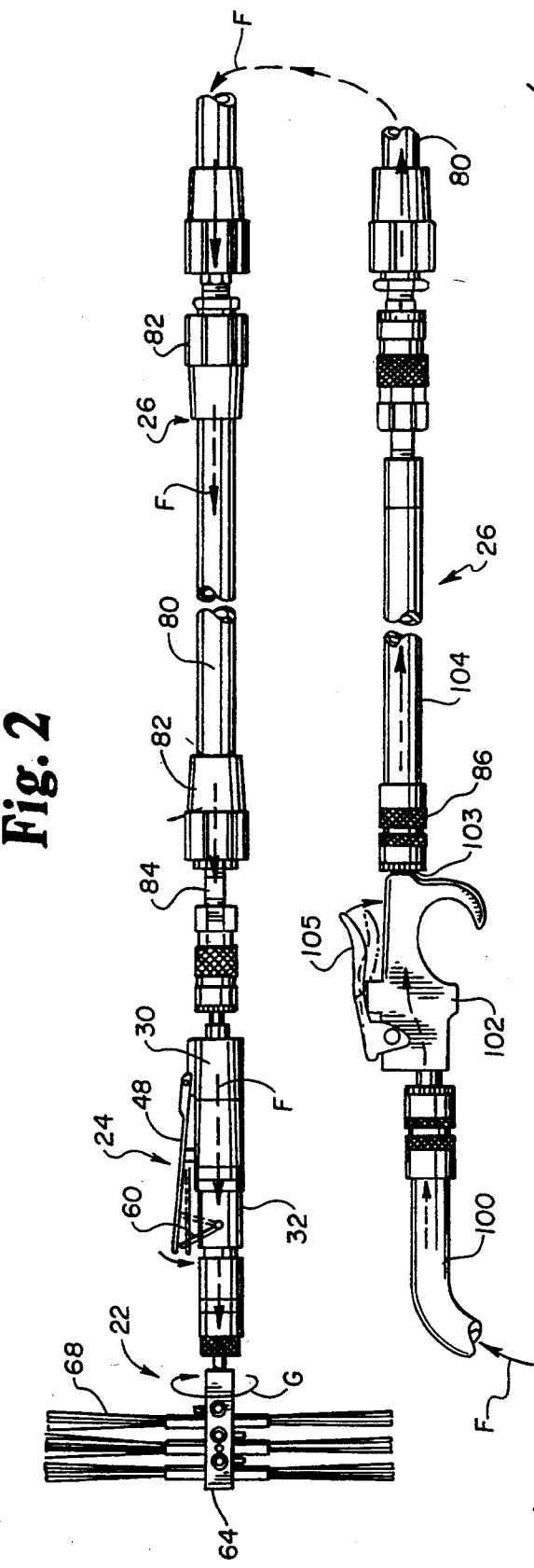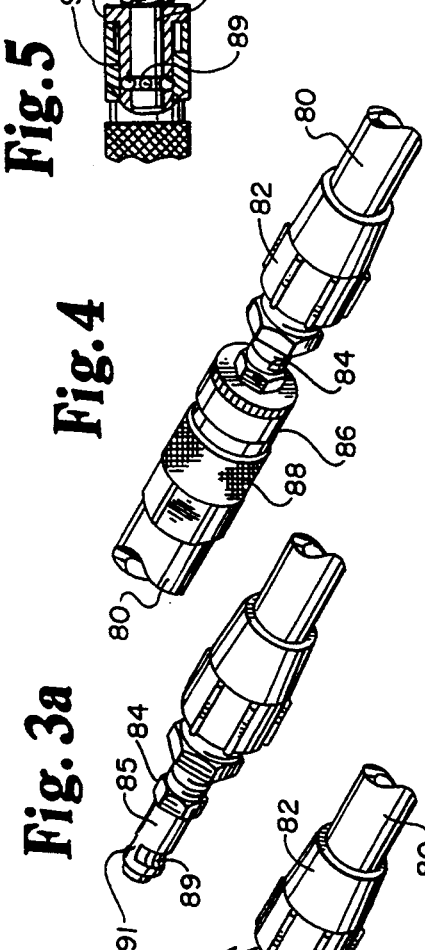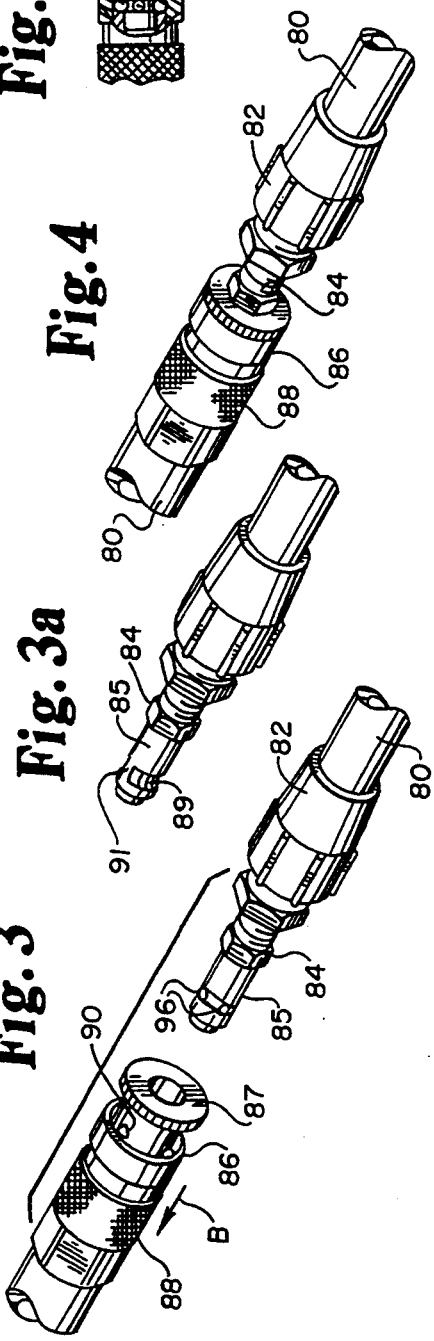

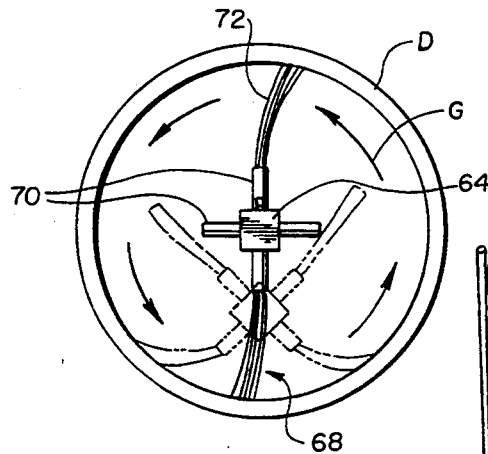
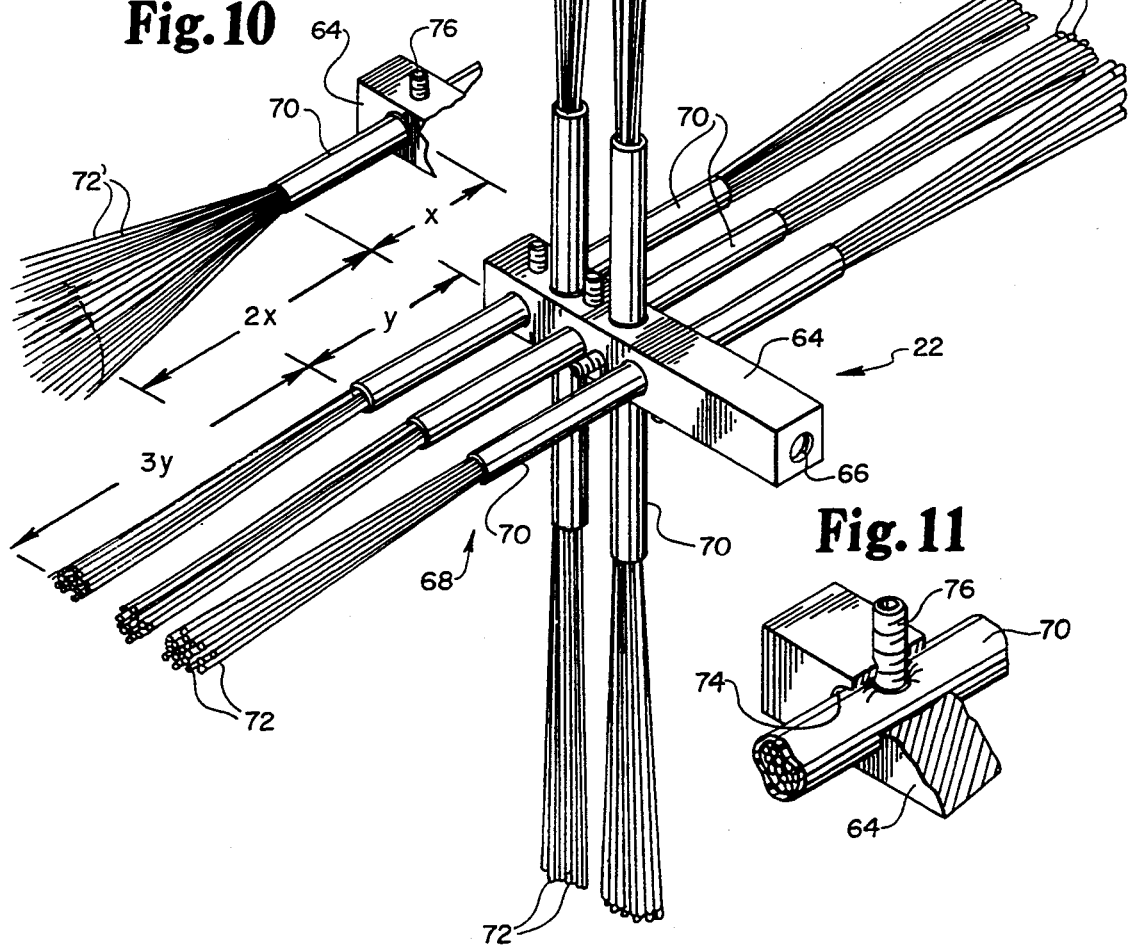
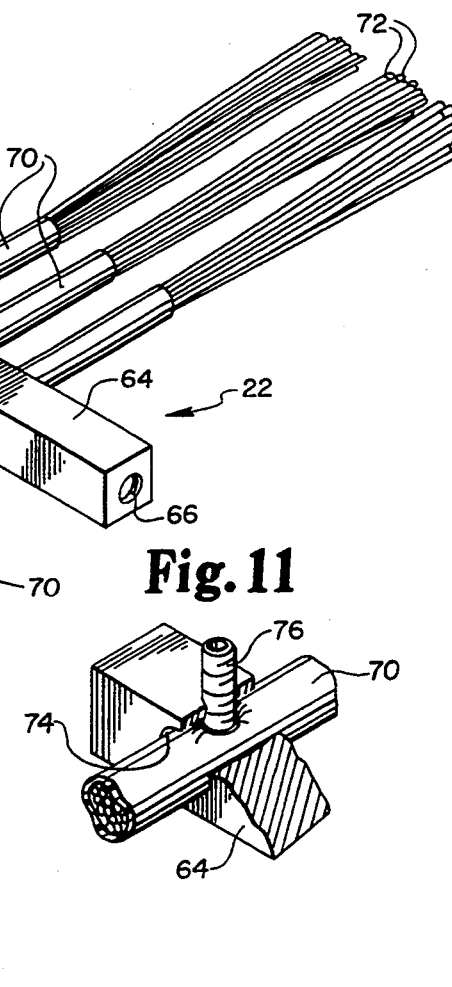

DUCT CLEANING APPARATUS

TECHNICAL FIELD

The present invention relates to duct or tube cleaning devices. In particular, it relates to an apparatus for cleaning deposits of dirt and debris from HVAC ducts, wherein the apparatus may be used in ducts of different sizes and lined or unlined ducts.

BACKGROUND OF THE INVENTION

U.S. Pat. No. 4,666,530 (to Houser) discloses an apparatus for extracting dirt from ducting such as the duct work used in ventilation systems. A power unit is used to drive an auger or cleaning implement which is passed through the ventilation duct work to scour the inside surface of the duct work by means of flexible strands which dislodge the dirt. The disclosed apparatus uses a standard rotary drive cable connected to the power unit at one end and to an auger at the other end to cause the auger to rotate. The auger tends to be self-centering, but a distinct disadvantage of the apparatus disclosed by Houser and similar duct cleaning systems is that the rotary drive cable used in such systems makes the system very heavy and, therefore, limits the extent of travel into a continuous duct system.

U.S. Pat. Nos. 574,422 (to Hildreth), 754,955 (to Lemke), 1,584,740 (to Denny), 2,155,205 (to Rodgers) and 2,162,677 (to Reynolds) disclose fluid driven motors for use in flu or duct cleaning. The Denny and Rodgers patents disclosed air driven motors for driving a cleaning brush in a flu or a duct. While the Lemke patent discloses that a supply pipe may be attached to a casing of a rotary motor, none of this group of patents teaches a substantially rigid, yet lightweight conduit that serves as a handle for maneuvering a cleaning head.

Another cleaning apparatus is disclosed in U.S. Pat. No. 4,027,349 (to Clavin). The Clavin apparatus is adapted to travel along the interior of pipes and includes a pneumatic motor to drive a plurality of rotating brushes. The device disclosed by Clavin is not suitable for use in HVAC duct work, lined or unlined.

There are some problems which remain unaddressed by known cleaning devices. One such problem is how to enable easy, convenient cleaning of long, substantially continuous ducts by a single operator who can operate the cleaning apparatus with a high degree of safety. A cleaning apparatus should be able to be moved easily a substantial distance into a continuous duct, occupy a minimum amount of set-up time, and be adaptable to a wide variety of ducts including lined ducts.

Another problem is that many available cleaning devices, including devices such as the apparatus disclosed by Hauser, include standard rotary drive cables. Such cables, or liquid drive systems, make a cleaning device heavy, particularly as the distance from the working end to the operator increases. This limits the distance that such systems can be extended into a duct, requiring more expensive duct work with more access openings for cleaning. Another problem with drive cable systems is that the torque tends to wear or break the cable and the cable housing, particularly any joints therein, possibly injuring the operator.

Known duct, flu or pipe cleaning devices, including those devices disclosed in the above-noted patents, represent advances in the art. However, such equipment does not produce an optimally safe, effective cleaning system that can be tailored to onsite factors such as the length, diameter and type of the duct work to be cleaned. Therefore, an easily portable, safe duct cleaning apparatus for cleaning duct work as efficiently and safely as possible would be a decided improvement over known devices.

SUMMARY OF THE INVENTION

A cleaning apparatus for cleaning the inside surfaces of HVAC ducts or the like is provided by the present invention. The apparatus broadly includes a rotatable cleaning head, a fluid driven drive means, and a variable length lightweight handle. The cleaning head carries a plurality of brush members, each including a tubular stiffener and a group of bristles received in said stiffener. The drive means is a pneumatic motor adapted to rotate the cleaning head which is mounted on the output end of the motor. The input end of the motor is connected to the handle, and the end of the handle is connected to a source of pressurized fluid.

It is an object of the present invention to provide a cleaning apparatus for cleaning the inside walls of HVAC ducts or the like.

It is another object of the present invention to provide a cleaning apparatus for cleaning ducts, wherein the apparatus has a low cleaning head weight and, generally, is light enough to be operated by a single operator.

Yet another object of the present invention is to provide a lightweight, safe cleaning apparatus for cleaning inside HVAC ducts or the like, wherein the apparatus includes a plurality of interchangeable rotatable cleaning heads for cleaning a variety of sizes and types of HVAC ducts or the like, and wherein the handle for holding and manipulating the cleaning apparatus in the duct is variable conveniently in length and is lightweight.

One of the advantages of the present invention is that it may be operated by a single operator because of its low cleaning head weight and because of the generally tubular handle. Another advantage is that the cleaning apparatus can be adapted to clean a variety of ducts, including lined HVAC ducts. Changing the cleaning heads and the length of the handle is convenient and rapid and does not require special tools. The cleaning apparatus of the present invention is safe because the spinning or rotating portion of the apparatus, the cleaning head, is remote from the operator and because the handle includes means for preventing backlash or backspin.

BRIEF DESCRIPTION OF THE DRAWINGS

FIG. 1 is a perspective view of the cleaning apparatus of the present invention;

FIG. 2 is a side elevational view thereof;

FIG. 3 is a fragmentary exploded perspective view depicting the male and female quick release couplers for use in the present invention;

FIG. 3a depicts an alternative embodiment of the male quick release coupler;

FIG. 4 is a fragmentary perspective view depicting the couplers connected;

FIG. 5 is a fragmentary side elevational view of the connected couplers, with portions cutaway to show the associated anti-rotation means;

FIG. 8 is a front elevational view depicting the operation of a cleaning head;

FIG. 9 is a perspective view of a cleaning head, depicting coarse brush members;

FIG. 10 is a fragmentary perspective view of a cleaning head, depicting fine brush members, and;

FIG. 11 is a fragmentary perspective view of a cleaning head, depicting how the brush members may be connected thereto.

DETAILED DESCRIPTION OF THE PREFERRED EMBODIMENT

Figure 6:
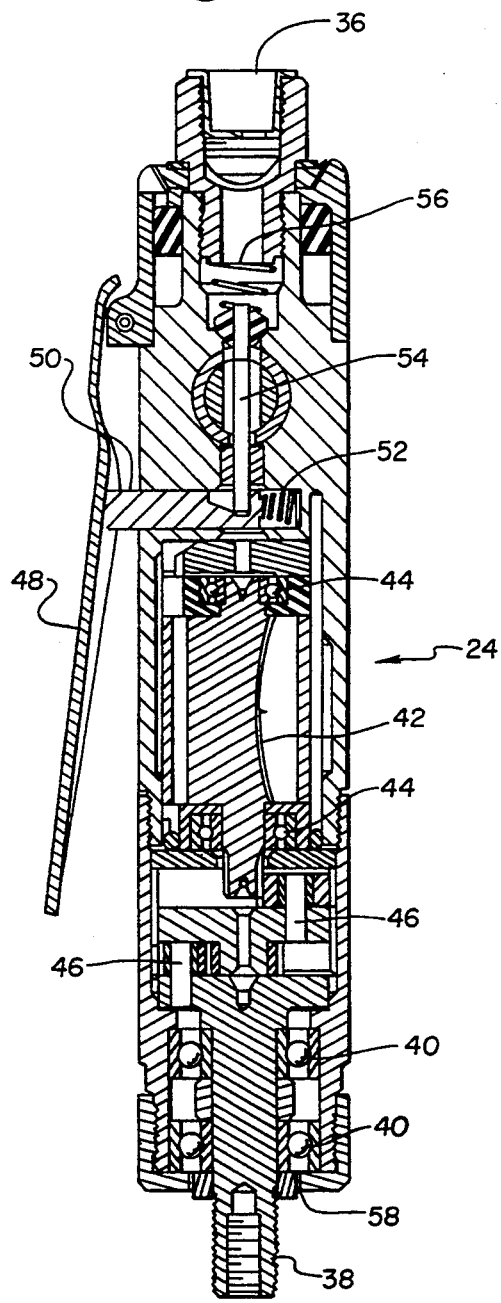
FIG. 6 is a cutaway side elevational view of the drive means for the present invention.

The cleaning apparatus 20 in accordance with the present invention is depicted in FIG. 1. The apparatus 20 includes a cleaning head 22, a drive means 24, and a handle 26. The apparatus 20 is adapted to be connected to a source of pressurized fluid such as an air compressor or pressure tank 28 with an associated pressure gauge 29. Although a pressure tank or air compressor tank is depicted as the source of pressurized fluid for operating the apparatus 20 of the present invention, is not beyond the scope of the invention that other sources of pressurized fluid may be used to drive the drive means 24.

Figure 7:
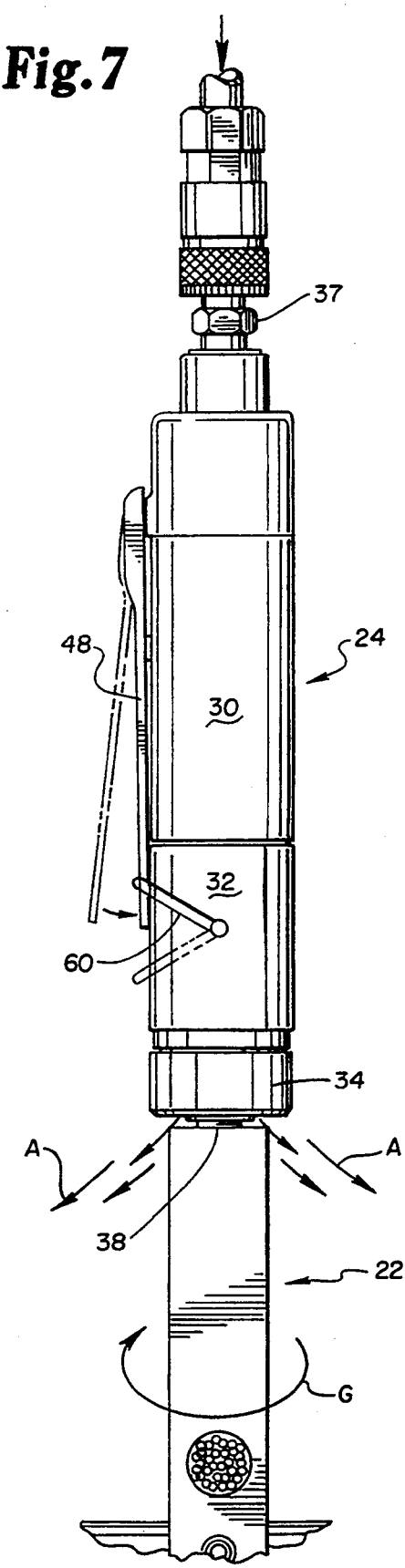
FIG. 7 is a side elevational view depicting the drive means with a cleaning head and the handle attached thereto.

Referring to FIGS. 6 and 7, the preferred drive means 24 is a pneumatic motor and includes a generally cylindrical main housing 30 and mid-housing 32. One end of the mid-housing 32 is threadably received on the main housing 30, and the other end threadably receives a housing cap 34. The second end of the main housing 30 has a pressurized fluid inlet orifice 36 adapted to receive a typical fitting 38. The output end of the drive motor 24 includes a driven mandrel 38 adapted to receive the cleaning head 22 of the present invention. A plurality of bearings 40 are received in the mid-housing 32 to rotatably support the mandrel 37. An impeller 42 is rotatably mounted in a typical bearing arrangement 44 in the main housing 30 and is linked to the mandrel 38 by a plurality of drive pins 46.

The main housing 30 carries an operating lever 48 which is pivotally connected to the housing 30. The operating lever 48 depresses a release button 50 against the bias provided by compression spring 52. Depressing the release button 50 moves a release needle 54 against the tension provided by a seating compression spring 56 to open a pathway from the inlet 36 through the drive means 24. The flow of pressurized fluid, such as air under pressure, spins the impeller 42, in turn spinning the mandrel 38 and a cleaning head 22 carried thereby. The housing cap 34 includes an exhaust vent 58 for completing the flow path through the motor 24 (depicted by arrows A in FIG. 7). FIG. 7 also depicts that the drive motor 24 may include an operating lever lock 60 pivotally connected to the mid-housing 32.

The cleaning head 22 depicted in the Figs. is intended to be representative of a variety of suitable heads of similar type, the choice of such heads being based on the size and type of duct to be cleaned. Referring to FIGS. 9-11, the cleaning head 22 includes a short substantially rigid and solid brush head body 64. One end of the body 64 has a mandrel receiving aperture 66 whereby the brush body 64 is operably connected to the mandrel 38. Adjacent the opposite end of the brush body 64, the cleaning head 22 includes a plurality of discreet brush members 68. The members 68 are spaced from each other along the axial length of the brush body 64 and extend generally perpendicularly outwardly therefrom. Each individual brush member 68 includes a tubular brush stiffener 70 and a plurality of individual bristle strands 72. Referring to FIG. 11, the tubular stiffeners 70 are received in through-bores 74 in the brush body 64. A set screw 76 is associated with each stiffener 70 to compressibly hold it in the brush body 64.

The individual bristle strands 72 depicted in FIG. 9 are coarse bristle strands, having a relatively large diameter and being fairly stiff. FIG. 10 depicts an alternative brush in which softer, finer bristle strands 72' are used with substantially similar brush stiffeners 70. FIGS. 9 and 10 also depict that the brush member bristle strands 72, 72' are at least twice as long as the length of the stiffeners 70; in FIG. 9, the bristles are three times as long as the stiffeners 70. The depicted lengths and the length relationship between the bristles 72, 72' and the tubular stiffener 70 is intended to be representational. The cleaning head 22 for use with the present invention may be adapted according to the stiffness or resiliency of the bristles, the type of dirt or debris to be removed from a duct, and the size and type of the duct being cleaned. For example, in an HVAC duct lined with delicate or fragile insulating material, a cleaning head 22 carrying fine soft individual brush strands 72' (FIG. 10) would be used to avoid damaging the lining of the duct. The cleaning head 22 carrying coarse, relatively stiff bristles 72 (FIG. 9), would be suitable for use in an unlined duct.

Referring to FIGS. 1 and 2, the handle 26 of the present invention includes a plurality of individual handle members 80. The individual members 80 are substantially identical to each other, and while only two such members 80 are depicted in FIGS. 1 and 2, any number of the members 80 can be interconnected to form a handle 26 of the desired length. The individual members 80 range from three to ten feet in length, with the preferred length being five feet. Typically the handle may be up to fifty feet long, with the preferred length being approximately twenty-five feet.

Each handle member 80 is adapted at each end by fittings to receive quick release couplers, male and female couplers 84, 86, respectively, as depicted in FIGS. 3, 3a, 4 and 5. As shown in FIGS. 3 and 4, the quick-release male and female couplers 84, 86 of the present invention are substantially typical, commercially available couplers. The male coupler 84 is received in the fitting 82 and broadly comprises a hollow, generally cylindrical member 85 aligned with the lumen of the handle member 80 to which it is attached.

Also referring to FIG. 3, the female quick release coupler 86 includes an inside member 87 and a slidably mounted concentric outside collar member 88. A plurality of detent ball bearings 90 are received about the circumference of the inside member 87 and are held in place between the inside and outside collar members 87, 88, respectively, by the inner diameter of the outside member 88. FIG. 5 depicts that the inner diameter of the outside collar 88 includes a narrow portion 92 and a wider portion 94, whereby when the outside collar 88 is moved in the direction of arrow B in FIG. 3, the ball bearings are able to move outwardly so that the male connector 84 can be received in the interior member 87 of the female coupler 86. Then the outside collar 88 is released into the position depicted in FIG. 5 whereby the detent balls 90 are pushed inwardly into an annular depression 89 in the male connector 84. The coupled quick-release coupling members 84, 86 are depicted in FIG. 4.

Referring back to FIG. 3, the male connector 84 is provided with a plurality of dimples 96 spaced about the outside surface thereof in the depression 89. The dimples 96 are for receiving the ball bearings 90 to prevent backlash or backspin as the cleaning head 22 of the present invention rotates. FIG. 3a depicts an alternative embodiment of the anti-rotation means associated with the male quick-release coupler member 84. Specifically, the connection depression area 89 of the male coupler 84 includes at least one welded ridge member 91 for preventing the female member 86 from spinning around the male member 84.

FIGS. 1, 2 and 8 depict the cleaning apparatus 20 of the present invention setup for use and in use (FIG. 8). An air hose 100 is connected to the source of compressed air 28 at one end and to a blow gun type control operating valve 102 at its opposite end. The other end of the control gun 102 is coupled to a male adaptor 103 and to another length of air hose 104 or, alternatively, it may be connected directly to one of the individual handle members 80. A first individual handle member is then coupled to the air hose section 104. A second individual handle member 80 may be coupled to the first member 80 and so on until a handle of the required length is provided. In this manner, the cleaning head 22 at the working end is advanced into the duct D. At the working end of the apparatus 20, the handle 26 is coupled to a female quick-release coupler 86 received in the motor inlet opening 36. A cleaning head 22, carrying brush members 68 of the desired size and degree of coarseness, is carried at the output end of the motor 24. The handle lock 60 may be used to lock the motor lever operator 48 in its on position for use at locations remote from the entrance to the duct. The air flow path through the apparatus 20 thus assembled is depicted by arrows F in FIG. 2, and the rotation of the cleaning head 22 is depicted at arrow G. The operator valve 102, specifically the operating lever 105 thereof, may be used to interrupt the air flow to start and stop the rotation of the cleaning head 22.

An advantage of the present invention is depicted in FIG. 8, wherein arrows G again depict the rotation of the cleaning head 22 within a duct D. Specifically, when the air flow through the handle 26 and the motor 24 is interrupted, the cleaning head 22 assumes the position of rest depicted in phantom in FIG. 8. When the air flow resumes, driving the motor 24 to spin the cleaning head 22 in direction G, the centrifugal force and natural resiliency of the bristles 72 or 72' cause the cleaning head 22 to center itself in the duct D. This self-centering reduces wear on the bristles, makes the apparatus 20 easier to manipulate, and enhances the performance of the cleaning apparatus 20 because the inside of the duct wall is contacted throughout the 360° spin of the cleaning head 22.

A number of variations to the present invention can be made. For example, although the cleaning heads 22 include four sets of brush members 68, more or fewer sets could be provided. Further, although the brush sets 68 are depicted at right angles with respect to each other, six groups of brush members 68 could be provided at 45° with respect to each other, or any angle, as long as balance is maintained. The length of the brush members 68 may be varied according to the size and nature of the duct to be cleaned; however, the bristle members 72, 72' should be at least twice as long as the stiffener tube 70. Cleaning head size typically ranges between eighteen to twenty-four inches in diameter. The bristles may be formed of suitable material (monofilament polymers, cloth, etc.), as can the handle members of the present invention. A preferred handle material is an appropriate gauge of PVC. Such plastics, in the form of a pipe, may be used to provide a handle of sufficient rigidity yet one with some inherent flexibility to facilitate cleaning curved ducts. Any suitable motor, driven by a pressurized fluid may be used as long as the cleaning head weight is kept below approximately two pounds to facilitate using the apparatus 20 at substantial distances from the operator. Any source of compressed or pressurized fluid may be used, with pressurized air being preferred.

The apparatus 20 of the present invention includes several models depending on the type and size of duct to be cleaned. For all models, commercially available components, some of which may be modified (eg: the male couplers, the motor, the brush members), include:

| | |
|---|---|
| Cleaning head body 23 | bored bar aluminum |
| stiffeners 70 | .5 inch O.D. PVC tubing |
| bristles 72 | TYNEX ® filaments (E.I. Du Pont De Nemours & Co., Inc., Wilmington, DE) or other suitable polymers or materials |
| drive motor 24 | ARO ® 20 series drills, model no. DL022B-15-P (Ingersoll-Rand Company, Southern Pines, NC) |
| handle members 80 | .75 inch PVC conduit |
| quick-release couplers 84, 86 | Tru-Flate male nipple, model 12-125, (modified); Tru-Flate female quick coupler, model 13-135 (Plews Division-EPICOR Industries, Eden Prairie, MN) |
| blow gun 102 | Tru-Flate, model 18-207 (Plews Division-EPICOR Industries, Eden Prairie, MN) |
| pressurized fluid source 28 | Air compressor, model W (EMGLO Products Corp., Johnstown, PA) |

The above-identified motor 24 is designed to drive the cleaning head 22 at approximately 1000–2000 RPM, 1500 RPM being preferred, at an air pressure of between 60–220 p.s.i., 140–180 p.s.i. being preferred. These parameters provide optimal knockdown of dirt from duct walls, centering effect and operator control and safety.

The present invention may be embodied in other specific forms without departing from the essential attributes thereof. It is therefore desired that the present embodiments be considered in all respects as illustrative and not restrictive, reference being made to the appended claims to indicate the scope of the invention.

What is claimed is:

1. A cleaning apparatus for cleaning the interior of a ventilation duct or the like, said apparatus comprising:
   a rotatable cleaning head carrying a flexible brush means for contacting the interior of said duct, said cleaning head having a substantially rigid body with a first end adapted to be connected to a pneumatic drive means and a second free end, said flexible brush means adjacent to said free end and comprising a plurality of discreet brush members axially spaced along and extending radially outwardly from said body, each brush member including a tubular brush stiffener having an area immediately adjacent to said body, a free end spaced from said body and a length, and a plurality of flexible bristles received in said stiffener and extending from said body for a length longer than the length of said stiffener;

said pneumatic drive means connected to said cleaning head for rotating said cleaning head at a rate whereby the bristles of the flexible brush means contact the interior of said duct; and substantially hollow tubular lightweight elongated handle means for holding and manipulating said cleaning head in said duct, said handle means integrally adapted to provide said drive means with air.

2. The cleaning apparatus according to claim 1, wherein said bristles have a total length and extend from the associated stiffener for a length that is at least twice as long as the length of said associated stiffener and at least two-thirds of said total length.

3. The cleaning apparatus according to claim 2, wherein said handle means comprises at least one tubular member with a first end adapted to be releasably connected to said drive means and a second end adapted to be releasably connected to a pressurized air source.

4. The cleaning apparatus according to claim 3, wherein said at least one tubular member includes a male coupler at one of said ends and a female coupler at the other of said ends whereby a plurality of said tubular members may be connected to provide a handle means of a selected length.

5. The cleaning apparatus according to claim 4, wherein said male coupler includes anti-rotation means for preventing backspin when said cleaning head is rotating.

6. The cleaning apparatus according to claim 5, wherein said anti-rotation means comprises at least one dimple associated with said male coupler.

7. The cleaning apparatus according to claim 5, wherein said anti-rotation means comprises at least one ridge associated with said male coupler.

8. The cleaning apparatus according to claim 7, wherein said drive means comprises a pneumatic motor.

9. A cleaning apparatus for cleaning the interior of a ventilation duct or the like, said apparatus comprising:

a rotatable cleaning head carrying a flexible brush means for contacting the interior of said duct, wherein said cleaning head has a substantially rigid body with a first end and a second free end, and wherein said flexible brush means is adjacent to said free end and comprises a plurality of discreet brush members axially spaced along and extending radially outwardly from said body, each brush member having a total length and including a tubular brush stiffener having an area immediately adjacent to said body, a free end spaced from said body and a length, said brush member further including a plurality of flexible bristles received in said stiffener and extending therefrom for a length longer than the length of said stiffener and at least two-thirds of said total length;

a generally cylindrical pneumatic motor connected to said first end of said cleaning head for rotating said cleaning head whereby said flexible brush means contacts the interior of said duct; and a substantially hollow tubular lightweight elongated handle for holding and manipulating said cleaning head in said duct, said handle integrally adapted to provide a conduit to provide said motor with pressurized air and comprising at least one tubular member with a first end adapted to be releasably connected to said motor and a second end adapted to be releasably connected to a source of pressurized air.

10. The cleaning apparatus according to claim 9, wherein said at least one tubular member includes a male coupler at one of said ends and a female coupler at the other of said ends whereby a plurality of said tubular members may be connected to provide a handle means of a selected length, at least one of said couplers having anti-rotation means associated therewith for preventing said at least one tubular member from rotating when said cleaning head is rotating.

11. The cleaning apparatus according to claim 10, wherein said anti-rotation means comprises at least one dimple associated with said male coupler.

12. The cleaning apparatus according to claim 10, wherein said anti-rotation means comprises at least one integral raised portion associated with said male coupler.

13. The cleaning apparatus according to claim 1, wherein each said stiffener length is one-fourth to one-third of the length of said brush member.

14. The cleaning apparatus according to claim 9, wherein each said stiffener length is one-fourth to one-third of the length of said brush member.

* * * * *